May 4, 1954 L. W. PARKER 2,677,724
INTERCARRIER SOUND SYSTEM
Filed June 22, 1951

INVENTOR.
LOUIS W. PARKER
BY C. A. [signature]
ATTORNEY

Patented May 4, 1954 2,677,724

UNITED STATES PATENT OFFICE 2,677,724

INTERCARRIER SOUND SYSTEM

Louis W. Parker, Great Neck, N. Y.

Application June 22, 1951, Serial No. 233,040

11 Claims. (Cl. 178—5.8)

This invention relates to intercarrier sound systems in television receivers, such as shown and described in my U. S. Patent No. 2,448,908.

A particular object of this invention is to obtain a considerably greater amount of frequency modulated carrier voltage (sound) from the output of the conventional video amplifier than heretofore obtainable, without in any way harmfully affecting that amplifier's function of amplifying the video signals.

Another object is to convert this greater amount of frequency modulated carrier voltage into audio frequency signals with the use of only one tube.

By achieving the above and some other ancillary objects, this invention permits the design and production of television receivers, with the sound reproduction portion less expensive than was heretofore believed possible.

Still other objects and advantages of my invention will be apparent from the specification.

Figures 1, 1A:
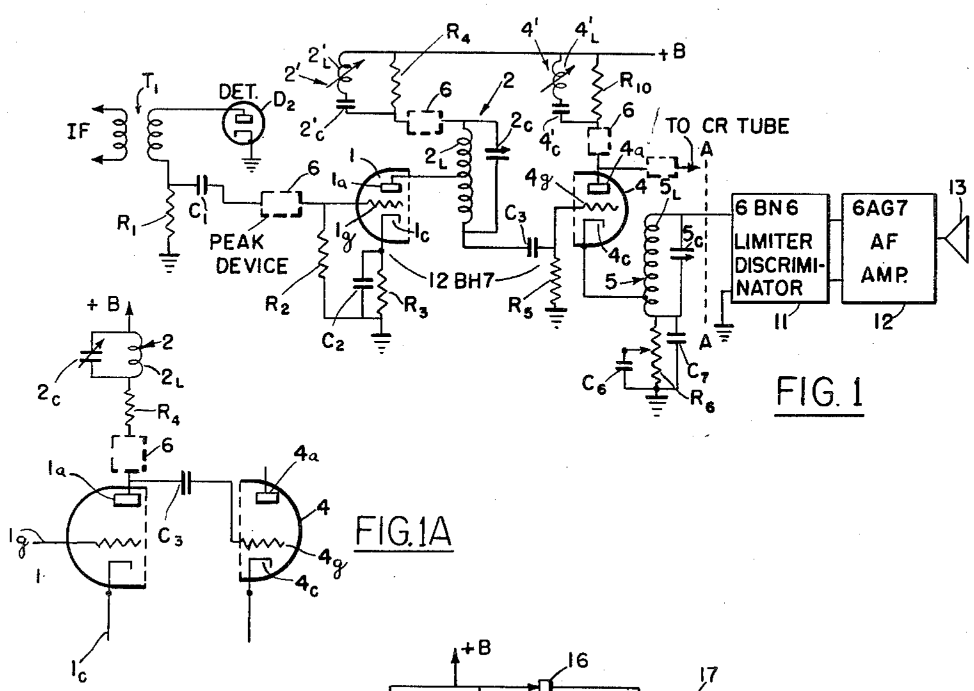
Figure 2:
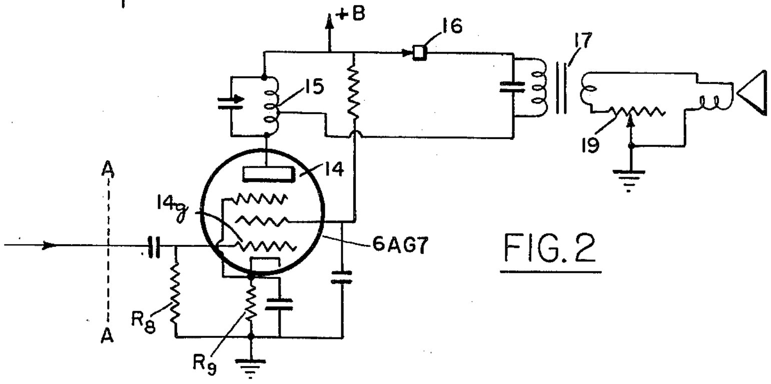
Figure 3:
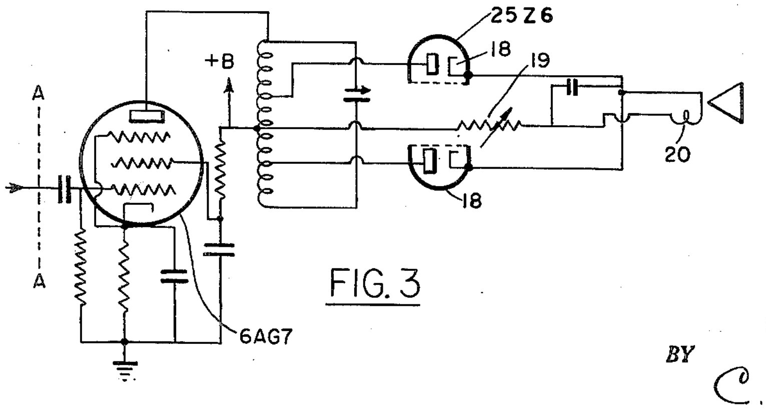

The features of novelty which I believe to be characteristic of my invention are set forth with particularity in the appended claims. My invention itself, however, both as to its fundamental principles and as to its particular embodiments, will best be understood by reference to the specification and accompanying drawing, in which:

Fig. 1 is a circuit diagram of the video and sound portion of a television receiver employing one embodiment of my invention, Fig. 1A is a circuit diagram of a modified form of the invention, Fig. 2 is a circuit diagram of a single tube form of discriminator which may be used in the invention, and Fig. 3 is a circuit diagram of another form of discriminator which may be used in my invention.

As described in my above mentioned patent, when using the intercarrier sound system, the ratio of picture and frequency modulated sound output voltages of the second detector of a superheterodyne television receiver must be quite high, of the order of 20 to 1. In other words, if the peak to peak video output voltage is one volt at this point, the peak to peak FM signal (sound) output may be approximately 50 millivolts. Higher amplitudes of FM carrier at times may be amplitude modulated by the picture signal, for reasons described in the above mentioned patent.

In my present invention, the video and FM signals at about the 20 to 1 ratio are amplified by a cascade double triode amplifier. Double triode cascade video amplifiers for television receivers have become common in recent years.

My method of using this form of amplifier is such that the gain of the first cascade stage for the FM signal, which will be hereafter assumed to be at 4.5 mc. center frequency, is several times as high as it is for the video signal.

Present day standards require the center frequency of the sound carrier, frequency modulated, to be spaced 4.5 mc. above the picture carrier frequency. Should these standards change, by specifying a different carrier frequency spacing, the figure of 4.5 mc. mentioned herein will become the new figure representing the new frequency difference between the sound and picture carriers.

According to my method, the gain of the first amplifier stage at 4.5 mc. may be 20, while for the video signal it may only be 5. Assuming the above figure of 1 volt video signal and 50 millivolts of 4.5 mc. sound carrier (frequency modulated) at the detector output, the same signals will be 5 volts and 1 volt respectively at the grid of the second cascade stage.

One circuit for accomplishing this is shown in Fig. 1, wherein $T_1$ is the I. F. transformer preceding the second detector $D_2$, which may be a diode with its cathode grounded and its anode connected through the secondary of transformer $T_1$, and through resistor $R_1$ to ground.

The detected voltage may be impressed on the grid $1_g$ of the first stage 1 of the double triode, through condenser $C_1$, and any suitable peaking device 6, well known in the art and therefore shown only in block form. The grid of stage 1 may be connected to ground through resistor $R_2$ and cathode $1_c$ may also be connected to ground through cathode resistor $R_3$ shunted by condenser $C_2$.

The anode $1_a$ is preferably connected (in the embodiment of the invention now being described) to an intermediate point on inductance $2_L$ of resonant circuit 2, also including condenser $2_c$, tuned to 4.5 mc. One end of this circuit may be connected through peaking device 6 (the use of which is optional) and resistor $R_4$ to +B, the negative terminal of which is grounded. The other terminal of the resonant circuit 2 is connected through condenser $C_3$ to the grid $4_g$ of the second stage 4 of the double triode, and to ground through resistor $R_5$.

Resistor $R_4$ is shunted by series tuned circuit 2', consisting of inductance $2'_L$ and condenser $2'_c$, tuned to 4.5 mc. Condenser $2'_c$ should be of low value, such as 5 mmf., as otherwise the higher video frequencies may be reduced by being shunted to plus B and thence to ground.

Because the effective impedance of tuned circuit 2 is many times the resistance of the usual plate load resistor $R_4$, considerably greater amplification is obtained at the resonant frequency than at others. Also, by tapping into an intermediate point on coil $2_L$, the amplified voltage is first developed in only a portion of the coil, while due to resonance currents, and magnetic coupling, additional voltage is developed across the remainder of the coil, and the total voltage across the entire coil is more than the A. C. voltage at plate $1_a$.

As long as the amplification of stage 1 is linear, there is no undesirable interaction between the video signals and the 4.5 mc. sound signal.

An alternative to the construction of Fig. 1 is shown in Fig. 1A. In this figure, for simplicity, only the connections which differ from Fig. 1 are shown, it being understood that otherwise the circuit is the same as in Fig. 1. In this modification, tuned circuit 2 is changed from the position of Fig. 1 to a point in series with the anode $1^a$, the tap on inductance $2_L$ is omitted, tuned circuit 2' is omitted, and anode $1^a$ is connected to grid $4_g$ through condenser $C_3$. This modification is somewhat cheaper than the circuit of Fig. 1, because of the elimination of one tuned circuit and the tap on coil $2_L$, but the gain is ordinarily not as great as in the circuit of Fig. 1.

Assume now that the signal voltages mentioned above are impressed on grid $4_g$ of the second triode stage 4. As an example, in one embodiment of the invention, these voltages were found to be approximately 5 volts peak to peak video signal and 1 volt peak to peak 4.5 mc. FM signal.

Ordinarily, the second stage will amplify the 4.5 mc. signal less than the video signal, say only half as much. Even so, the amount of 4.5 mc. FM signal in the output of stage 4 would be very disturbing to the picture. In addition, the two peak voltages at times would coincide and throw the tube operation off the linear portion of its characteristic, causing intermodulation.

To obviate this difficulty I introduce a large amount of what I term "frequency selective degeneration," at 4.5 mc. into the circuit of the second amplifier stage 4. No appreciable degeneration is used at the video frequencies, therefore the amplifier operates normally at these frequencies, the highest of which is approximately 4 mc., while circuit 5 is tuned to 4.5 mc.

Frequency selective degeneration is accomplished by the use of tuned circuit 5, including inductance $5_L$ and condenser $5_c$, a portion of the former being tapped so that the cathode circuit extends to ground through a portion of coil $5_L$ and resistor $R_6$ in series, the latter being variably shunted by condenser $C_6$, variably tapped on resistor $R_6$. This serves to control the picture contrast in a manner which will be understood. Coil $5_L$ is shunted by condenser $5_c$, and resistor $R_6$ is shunted by low capacity condenser $C_7$.

Due to the high impedance of this tuned circuit, stage 4 operates almost as a cathode follower at the 4.5 mc. frequency, and, as is well known, the R. F. voltage will be nearly the same across this tuned cathode load as was applied to the grid. This voltage, which is between cathode and ground, has the opposite effect on the plate current as the voltage applied between grid and ground, and, since the two opposing effects are nearly equal, the net result is an almost complete elimination of plate current variation at the 4.5 mc. frequency. Therefore, the voltage between plate and ground will be almost entirely video frequency voltage.

The usual peaking devices and plate resistor may be employed in this as well as the first cascade stage plate circuit. Since these contain no other elements than are conventional, only a block form of them is shown at 6 with a diagrammatic connection to the grid of the cathode ray tube. Anode resistor $R_{10}$ may also be shunted by series resonant circuit 4' tuned to 4.5 mc. This further reduces the sound interference from the picture. However, this is necessary only in rare cases, such as when large pictures are required with top quality.

Another point should be explained here. A considerable increase of the 4.5 mc. (sound) voltage is obtained by the arrangement of circuit 5 as shown in Fig. 1. Only a small portion of coil $5_L$ is in series with the cathode and nearly the same voltage is developed across this portion as is applied to the grid of amplifier 4. The voltage between the upper end of coil $5_L$ and ground may be five times the voltage applied to the amplifier grid, which in the above example was 1 volt peak to peak. The measured voltage a cross entire coil $5_L$ in one embodiment of the invention was found to be about five volts, peak to peak.

This voltage may be used in any suitable manner to obtain the audio signal at the desired level. For example, it may be fed to a 6BN6 tube and its circuit 11, which acts as a limiter and discriminator. The circuit for this tube is well known and is used by receivers now on the market, therefore it is illustrated only as a block on Fig. 1. Usually only one stage of A. F. amplifier is used after the 6BN6. This A. F. amplifier 12 is also illustrated only as a block, feeding speaker 13. In this way two tubes compose the entire sound complement of the television receiver.

A still simpler and less expensive arrangement using only one tube and a crystal is shown in Fig. 2, it being understood that the circuit ahead of dotted line A—A is the same as the first part of Fig. 1 up to the line A—A. According to this modification, the 4.5 mc. frequency modulated signal is applied directly to the grid $14_g$ of a narrow grid swing pentode 14. One such tube is the type 6AG7 with low screen voltage, such as 100 volts. The A. C. voltage applied to the grid of this tube is considerably greater than the cathode bias, therefore most of the bias is self rectified from the 4.5 mc. signal across the grid resistor $R_8$. With such an arrangement the output across the plate load does not change appreciably with considerable changes in grid drive, since higher input voltages increase the bias and reduce the mutual conductance of the tube.

In this arrangement, tuned circuit 15 in the plate circuit of tube 14 is tuned slightly off the 4.5 mc. signal so that as the frequency varies due to modulation, the resonant rise changes and the output becomes amplitude modulated, an effect well known in the art. This amplitude modulated signal is rectified by rectifier 16 and the resulting A. F. and D. C. outputs are applied to audio transformer 17. As little as ½ watt A. F. output which this circuit is able to supply, is sufficient for television reception in smaller sets where the volume is not more than a loud speaking voice. In such cases a germanium crystal may be found satisfactory as rectifier 16, or two of these crystals may be used in full wave rectification to reduce the load on them.

It is also possible to rectify such low voltage and high current, that the voice coil of a speaker is fed directly and without the usual output transformer. Such an arrangement is shown in Fig. 3, where the input is not shown since everything ahead of the dotted line A—A is similar for all figures. In the case of Fig. 3, the voice coil 20 must have as high impedance as possible without too much expense, such for example, as 50 ohms. It must also be properly positioned with respect to the magnet in order to balance the pull of the steady direct current in it.

Instead of crystal rectifiers, a high perveance diode such as the 25Z6 may also be used as shown at 18. Volume may be controlled in the loud speaker circuit, as by control 19. The video gain is controlled, as was stated above, by controlling the shunt condenser $C_6$ on resistor $R_6$ in the V. F. amplifier cathode as shown in Fig. 1. If the V. F. gain be reduced in this manner, the FM output drops slightly due to resistance introduced in the circuit of coil $5_L$. This can be stopped almost entirely with a small condenser $C_7$ which provides a permanent low impedance to the 4.5 mc. signal. The effect of this condenser (which, in the embodiment described, was 100 mmf.) on the video signal, is negligible.

In practice it was found that with a 12BH7 tube, best results were obtained when the plate resistor of the first cascade amplifier was low, such as 1,000 ohms. This reduced the great ratio of picture to sound signal voltage and also made it unnecessary to use any peaking device 6. The second tuned coil $5_L$ was tuned to a point where sound was eliminated from the picture. It was found that this does not correspond exactly to the point where the greatest 4.5 mc. signal is obtained, but the reduction in this signal was not significant; the use of series resonant circuit 2' has been found advantageous, but resonant circuit 4' was found unnecessary with a 16 inch cathode ray tube.

The total gain for low video frequencies was about 5 in the first stage and 8.5 in the second. The second stage used 4,000 ohms plate resistor. For 4.5 mc., the gain of the first stage was approximately 20 and that of the second approximately 5. The gain in the second stage was due purely to resonance rise. The total gain of about 100 for the FM signal is by no means the best obtainable. By using higher Q coils, better LC ratios, or higher mutual conductance tubes, such as, for example, a 12AT7, considerably higher gain figures may be obtained.

In the specification, I have particularly pointed out and distinctly claimed the part, improvement or combination which I claim as my invention or discovery, and I have explained the principles thereof and the best mode in which I have contemplated applying those principles so as to distinguish my invention from other inventions.

While I have shown and described certain preferred embodiments of my invention, it will be understood that modifications and changes may be made without departing from the spirit and scope thereof, as will be clear to those skilled in the art.

I claim:

1. In an intercarrier sound and television receiver, first and second amplifiers connected in cascade, each having a cathode, an anode, and a control electrode, means for impressing on said amplifiers a voltage having a video signal component and an audio signal component respectively of different frequencies, said first amplifier including means for effecting a first amplification of said video signal component and for effecting a second and different amplification of said audio signal component, said second amplification being greater than said first amplification; means for coupling said differently amplified video and audio signals from the anode of said first amplifier to the control electrode of the second amplifier, means in said second amplifier for selectively preventing further substantial gain of said audio component signals, said second amplifier including means for effecting further substantial gain of video component signals, means for deriving video component voltage from the anode of said second amplifier, and means for deriving audio component voltage from the cathode of said second amplifier.

2. The combination claimed in claim 1 which includes a peaking circuit in at least one of the circuits of said anodes.

3. In an intercarrier sound and television receiver, first and second amplifiers connected in cascade, each having a cathode, an anode, and a control electrode, means for impressing detected intermediate frequency signals having video and audio components on said amplifiers, said first amplifier including frequency selective means for amplifying the said audio components to a greater extent than the said video components, and said second amplifier including further frequency selective means for amplifying the said video components to a greater extent than the said audio components, and means for deriving from the output of said second amplifier separate video and sound signal components.

4. In an intercarrier sound and television receiver, first and second amplifiers connected in cascade, each having a cathode, an anode, and a control electrode, means for impressing detected intermediate frequency signals having video signal components and frequency modulated audio signal components, said first amplifier including first means for amplifying said audio signal components to a greater extent than the said video components, and said second amplifier including second means for amplifying video components to a greater extent than the said audio components, the said second means including a frequency selective degenerative circuit connected in the cathode circuit of said second amplifier for decreasing amplification of audio signal components in the anode circuit of said second amplifier while increasing the audio signal component voltage available in the cathode circuit, means for deriving video signals from the anode of said second amplifier, and means for deriving audio component voltage from said frequency selective degenerative circuit.

5. In an intercarrier sound and television receiver, first and second amplifiers connected in cascade, means for impressing detected intermediate frequency signals having both video and frequency modulated audio components on the first of said amplifiers, said first amplifier including means for amplifying said audio components to a greater extent than the said video components, means coupling said differently amplified video and audio components from said first amplifier to said second amplifier; said second amplifier including further means for amplifying the said video components to a greater extent than the said audio components, the said further means including a frequency selective degenerative circuit, and means for deriving from the output of said second amplifier separate video and audio signal components.

6. In an intercarrier sound and television receiver, first and second amplifiers connected in cascade, each having a cathode, an anode, and a control electrode, means for impressing detected intermediate frequency signals having video and audio components on said amplifiers, said first amplifier including means for amplifying audio components to a greater extent than video components, and said second amplifier including means for amplifying video components in its anode circuit to a greater extent than audio components, means for deriving from the output of said second amplifier separate video and audio signal components, a single stage low grid swing amplifier coupled to the output of said second amplifier for further amplifying the said audio components only, means for converting said further amplified audio signals to amplitude modulated sound carrier currents, a detector fed by the amplitude modulated output of said low grid swing amplifier, and a loud speaker fed directly by said detector.

7. In an intercarrier sound and television receiver, first and second amplifiers connected in cascade, each having a cathode, an anode, and a control electrode, means for impressing detected intermediate frequency signals having video and frequency modulated audio components on said amplifiers, said first amplifier including means amplifying said frequency modulated audio components to a greater extent than the said video components, and said second amplifier including means for amplifying the said video components to a greater extent than the said audio components in its anode circuit, means for deriving from the output of said second amplifier separate video and frequency modulated sound signal components, a frequency modulation detector fed by said frequency modulated sound signal component, a single stage audio amplifier fed by the output of said detector, and a loud speaker fed by the output of said audio amplifier.

8. In an intercarrier sound and television rereceiver, first and second amplifiers connected in cascade, means for impressing detected intermediate frequency signals having video and frequency modulated audio components on said amplifiers, said first amplifier including means for amplifying sound components to a greater extent than video components, and said second amplifier including means for amplifying the said video components to a greater extent than the said audio components, means for deriving from the output of said second amplifier separate video and frequency modulated audio signal component outputs, a single stage low grid swing amplifier coupled to the said audio signal output of said second amplifier for further amplifying the said audio components, means coupled to said single stage amplifier for converting said audio signals to amplitude modulated sound carrier currents comprising a resonant circuit slightly detuned from the intermediate frequency of said audio signal component, a pair of taps at intermediate points on the inductance of said resonant circuit, rectifiers connected to said taps respectively, and a loud speaker having a relatively high impedance voice coil connected directly to said rectifiers.

9. In an intercarrier sound and television receiver, first and second grid-controlled amplifiers connected in cascade, means for coupling signals having both video and frequency modulated audio components to the input of the first of said amplifiers, said first amplifier including tuned circuit means primarily responsive to said audio components for selectively amplifying said audio components to a greater extent than said video components, said differently amplified audio and video components being coupled to the input of said second amplifier through said cascade coupling, said second amplifier including frequency selective degenerative means preventing further amplification of said audio components only, whereby said video components are amplified to a greater extent than said audio components in said second amplifier, and means for taking separate video and audio signal outputs from said amplifier.

10. The apparatus of claim 9 in which said first and second amplifiers are triodes, said tuned circuit means being coupled to the plate circuit of said first amplifier, and said frequency selective degenerative means being coupled to the cathode circuit of said second amplifier.

11. The apparatus of claim 10 in which said frequency selective degenerative means includes an inductance, said frequency selective degenerative means being coupled to the cathode circuit of said second amplifier through a tap on said inductance, said tap being displaced from the center point of said inductance whereby less than one-half said inductance is in series with the cathode of said second amplifier.

References Cited in the file of this patent

UNITED STATES PATENTS

| Number | Name | Date |
|---|---|---|
| 2,498,488 | Fyler | Feb. 21, 1950 |
| 2,504,662 | Dome | Apr. 18, 1950 |
| 2,505,843 | Smith | May 2, 1950 |